US007547895B2

(12) United States Patent
Manivannan et al.

(10) Patent No.: US 7,547,895 B2
(45) Date of Patent: Jun. 16, 2009

(54) IMAGING ASSEMBLY AND INSPECTION METHOD

(75) Inventors: Venkatesan Manivannan, Rexford, NY (US); Clifford Bueno, Clifton Park, NY (US); Stephen Jude Duclos, Clifton Park, NY (US); Stanley John Stoklosa, Clifton Park, NY (US); Douglas Albagli, Clifton Park, NY (US); Paul Alan Mc Connelee, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/846,990

(22) Filed: Aug. 29, 2007

(65) Prior Publication Data

US 2007/0290135 A1 Dec. 20, 2007

Related U.S. Application Data

(62) Division of application No. 11/088,039, filed on Mar. 23, 2005.

(51) Int. Cl.
  *G01N 21/64* (2006.01)
  *G01F 23/00* (2006.01)
(52) U.S. Cl. .................. 250/483.1; 250/358.1
(58) Field of Classification Search ............. 250/483.1, 250/358.1
  See application file for complete search history.

(56) References Cited

U.S. PATENT DOCUMENTS

| 3,706,885 A | 12/1972 | Fister et al. |
| 4,288,264 A | 9/1981 | Hague |
| 4,549,083 A | 10/1985 | Ozawa |
| 4,778,995 A | 10/1988 | Kulpinski et al. |

(Continued)

FOREIGN PATENT DOCUMENTS

EP  0393662  8/1996

(Continued)

OTHER PUBLICATIONS

D. Hreniak et al., "Structural and Spectroscopic Studies of Lu2O3/Eu3+ Nanocrystallites Embedded in SiO2 SOL-Gel Ceramics," Journal of Physics and Chemistry of Solids, 2003, pp. 111-119.

(Continued)

*Primary Examiner*—David P Porta
*Assistant Examiner*—Mindy Vu
(74) *Attorney, Agent, or Firm*—Penny A. Clarke

(57) ABSTRACT

An adaptable imaging assembly is provided. The adaptable imaging assembly includes a free-standing phosphor film configured to receive incident radiation and to emit corresponding optical signals. An electronic device is coupled to the free-standing phosphor film. The electronic device is configured to receive the optical signals from the free-standing phosphor film and to generate an imaging signal. A free-standing phosphor film is also provided and includes x-ray phosphor particles dispersed in a silicone binder. A method for inspecting a component is also provided and includes exposing the component and a free-standing phosphor film to radiation, generating corresponding optical signals with the free standing phosphor film, receiving the optical signals with an electronic device coupled to the free-standing phosphor film and generating an imaging signal using the electronic device.

17 Claims, 8 Drawing Sheets

U.S. PATENT DOCUMENTS

| | | |
|---|---|---|
| 5,083,031 A | 1/1992 | Hoelsher et al. |
| 5,306,367 A | 4/1994 | Suzuki et al. |
| 5,607,774 A | 3/1997 | Dahlquist et al. |
| 5,663,005 A | 9/1997 | Dooms et al. |
| 6,476,406 B1 * | 11/2002 | Struye et al. ........... 250/585 |
| 6,744,056 B1 | 6/2004 | Ogawa |
| 2002/0074929 A1 | 6/2002 | Taskar et al. |
| 2003/0111955 A1 | 6/2003 | McNulty et al. |
| 2004/0262536 A1 | 12/2004 | Van den Bergh et al. |
| 2005/0002490 A1 | 1/2005 | Bergh et al. |
| 2006/0060823 A1 | 3/2006 | Cooke et al. |
| 2006/0261722 A1 | 11/2006 | Bueno et al. |

FOREIGN PATENT DOCUMENTS

| | | |
|---|---|---|
| EP | 0648254 | 10/1996 |
| EP | 1065671 | 6/2001 |
| WO | 9400531 | 1/1994 |
| WO | 0071637 | 11/2000 |
| WO | 2004001964 | 5/2004 |

OTHER PUBLICATIONS

J. Trojan-Piegza et al., "Preparation of Nanocrystalline Lu2O3:Eu Phosphor via a Molten Salts Route," Journal of Aloys and Compounds, 2004, pp. 118-122.

C. Le Luyer et al., "Elaboration and Scintillation Properties of Eu3+-Doped Gd2O3 and Lu2O3 SOL-Gel Films," Abstract.

C. Brecher et al., :Hold Traps in Lu2O3:Eu Ceramic Scintillators, I Persistent Afterglow, Journal of Luminescence, 2004, pp. 159-168.

A. Lempicki, Pi et al., "Scintillation Materials for Medical Applications," Final Report, Boston University Department of Chemistry, Grant No. De-FG02-90ER60133, Dec. 1, 1997-Nov. 30, 1999, pp. 1-26.

EP Search Report, EP 06251230, May 17, 2006.

* cited by examiner

IMAGING ASSEMBLY AND INSPECTION METHOD

BACKGROUND OF THE INVENTION

The invention relates generally to an imaging assembly and inspection method. More particularly, the invention relates to a digital radiographic imaging assembly incorporating removable and replaceable layers.

X-ray phosphors are high-density luminescent materials that emit visible or near visible radiation when stimulated by x-rays or other high-energy electromagnetic photons, and hence are widely employed in various industrial and medical radiographic equipment. Coupling x-ray phosphors to photo diodes, charge coupled devices (CCDs), Complementary metal oxide semiconductors (CMOS devices), and photomultiplier tubes (PMTs) is an efficient way to convert x-rays to electrical signals. This development requires not only advanced x-ray phosphors with enhanced properties, such as high x-ray conversion efficiency, faster luminescence decay times, lower afterglow and greater stability in the radiation field, but also better coupling between the x-ray converter screen and the electronic detector. X-ray phosphors must be efficient converters of x-ray radiation into optical radiation in those regions of the electromagnetic spectrum (visible and near visible), which are most efficiently detected by photosensors, such as photomultipliers or photodiodes. It is also desirable that the x-ray phosphors have a high optical clarity, i.e., transmit the optical radiation efficiently to avoid optical trapping, as optical radiation originating deep in the x-ray phosphor body escapes for detection by externally situated photodetectors. This is particularly important in medical diagnostic applications, where it is desirable that x-ray dosage be as small as possible to minimize patient exposure, while maintaining adequate quantum detection efficiency and a high signal-to-noise ratio.

Afterglow is the tendency of the x-ray phosphor to continue emitting optical radiation for a time after termination of x-ray excitation, resulting in blurring, with time, of the information-bearing signal. Short afterglow is highly desirable in applications requiring rapid sequential scanning such as, for example, in imaging moving bodily organs. Hysteresis is the x-ray phosphor material property whereby the optical output varies for identical x-ray excitation based on the radiation history of the x-ray phosphor. Hysteresis is undesirable due to the requirement in computerized tomography for repeated precise measurements of optical output from each x-ray phosphor cell and where the optical output must be substantially identical for identical x-ray radiation exposure impinging on the x-ray phosphor body. Typical detecting accuracies are on the order of one part in one thousand for a number of successive measurements taken at relatively high rate. In real-time radioscopy, hysteresis can result in image ghosting, where prior imaging history is overlaid on the current radiographic imagery. This can lead to an erroneous diagnosis or interpretation. High x-ray stopping power is desirable for efficient x-ray detection. The phosphor screen utilized should stop the x-rays, at the same time should not hinder the subsequent light emission for capture by the photodetecting device.

The radiographic imaging systems known in the art suffer from one or more of these drawbacks. It would therefore be desirable to design a radiographic imaging system with enhanced sensitivity and better performance.

SUMMARY OF THE INVENTION

The present invention meets these and other needs. Briefly, in accordance with one embodiment of the present invention, an adaptable imaging assembly is provided. The adaptable imaging assembly includes a free-standing phosphor film configured to receive incident radiation and to emit corresponding optical signals. An electronic device coupled to the free-standing phosphor film is provided. The electronic device is configured to receive the optical signals from the free-standing phosphor film and to generate an imaging signal.

In accordance with another embodiment, a method for inspecting a component is provided. The method includes exposing the component and a free-standing phosphor film to radiation, generating corresponding optical signals with the free standing phosphor film, receiving the optical signals with an electronic device coupled to the free-standing phosphor film, and generating an imaging signal using the electronic device.

In another embodiment, a free-standing phosphor film comprising x-ray phosphor particles dispersed in a silicone binder is provided.

In yet another embodiment, a method of forming a free-standing phosphor film is provided. The method includes the steps of preparing a phosphor powder, where the phosphor comprises a x-ray phosphor; preparing a binder solution comprising a silicone binder and a curing agent; preparing a slurry by mixing the binder solution and the phosphor powder; forming a phosphor layer on a substrate by applying the slurry on the substrate; curing the phosphor layer to obtain a phosphor film; and removing the phosphor film from the substrate to obtain a free-standing phosphor film.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

An adaptable imaging assembly 20 is described with reference to FIG. 1. As shown for example in FIG. 1, adaptable imaging assembly 20 includes a free-standing phosphor film 10 configured to receive incident radiation and to emit corresponding optical signals. Free-standing phosphor film 10 and methods of making film 10 are described in greater detail below. The radiation source varies based on the application, and examples include x-rays, gamma rays, thermal neutrons and high-energy elemental particle radiation sources. For thermal neutrons, a supporting substrate such as a mylar support would greatly attenuate the incoming thermal neutron imaging beam pattern and reduce signal to noise. Thermal neutrons are highly absorbed in hydrogen containing materials such as mylar. These are merely examples and should not be interpreted to restrict the types of radiation that may be used. As used herein, the phrase "optical signals" should be understood to mean light. The wavelength of the light emitted by the phosphor film 10 is determined by the type of phosphor(s) used. Adaptable imaging assembly 20 further includes an electronic device 12 coupled to the free-standing phosphor film 10. The electronic device 12 is configured to receive the optical signals from the free-standing phosphor film 10 and to generate an imaging signal. The electronic device 12 may be coupled to the free-standing phosphor film 10 in several ways, including optical coupling (for example using a fiber optic plate), direct coupling and lens coupling. Exemplary electronic devices 12 include CCD, CMOS, photodiode arrays, photo-avalanche arrays, and α-Si (amorphous silicon) arrays. Typically, the electronic device 12 includes a number of light sensitive pixels arranged in an array. The array may be linear or an area array. In other embodiments, single pixel devices may be employed, such as photomultiplier tubes (PMTs).

In accordance with a particular embodiment, optical coupling fluids (not shown) or optical cement (not shown) are used between the free-standing phosphor film 10 and the electronic device 12 to offer improved matching of the respective indices of refraction of each element. This embodiment will thereby improve optical coupling efficiency and light collection. Example optical cements include, without limitation, UV-cured cement and optical epoxies.

Figure 5:
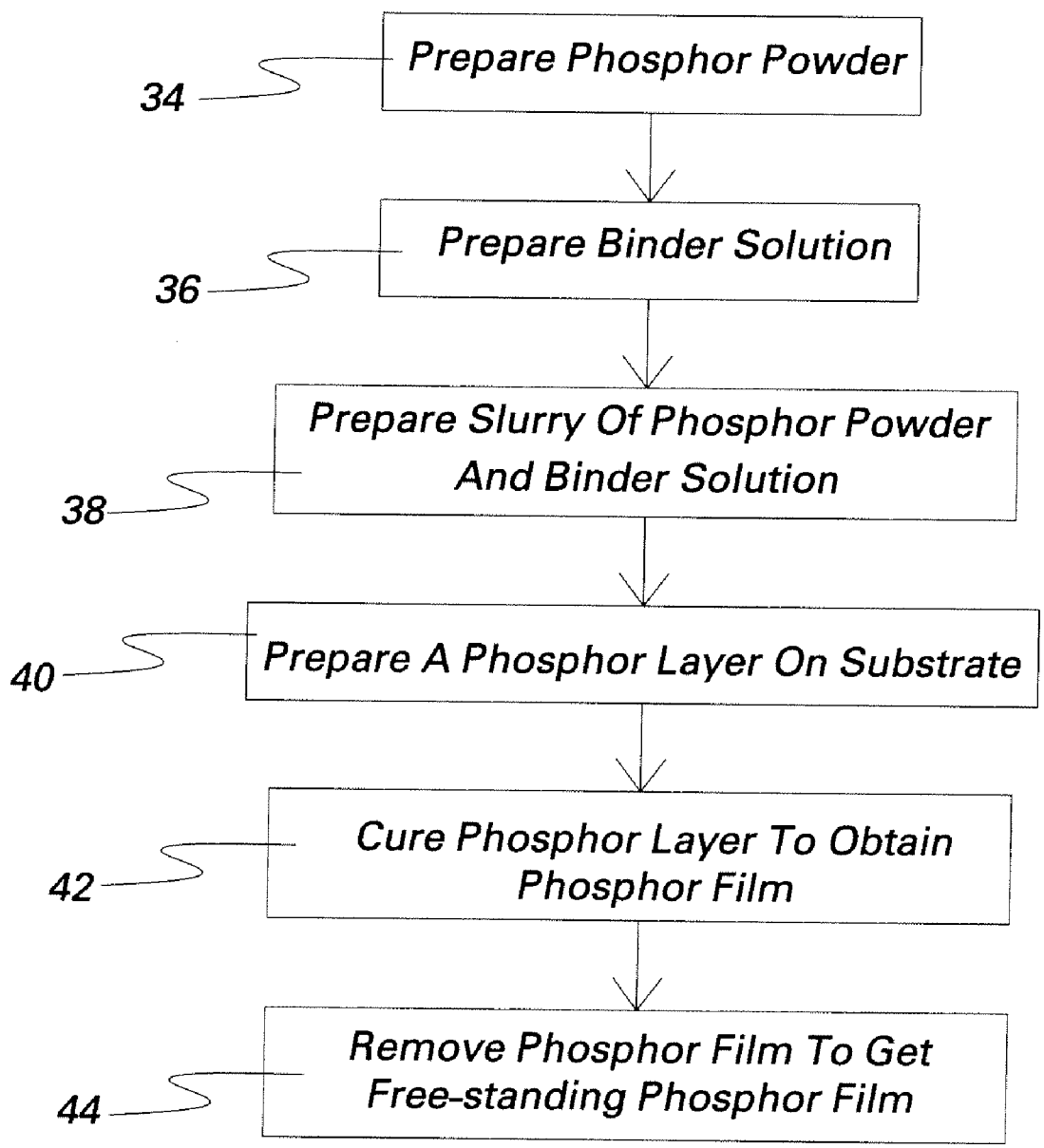
FIG. 5 is a flow diagram for preparing a free-standing phosphor film according to one embodiment of the present invention.
Figure 6:
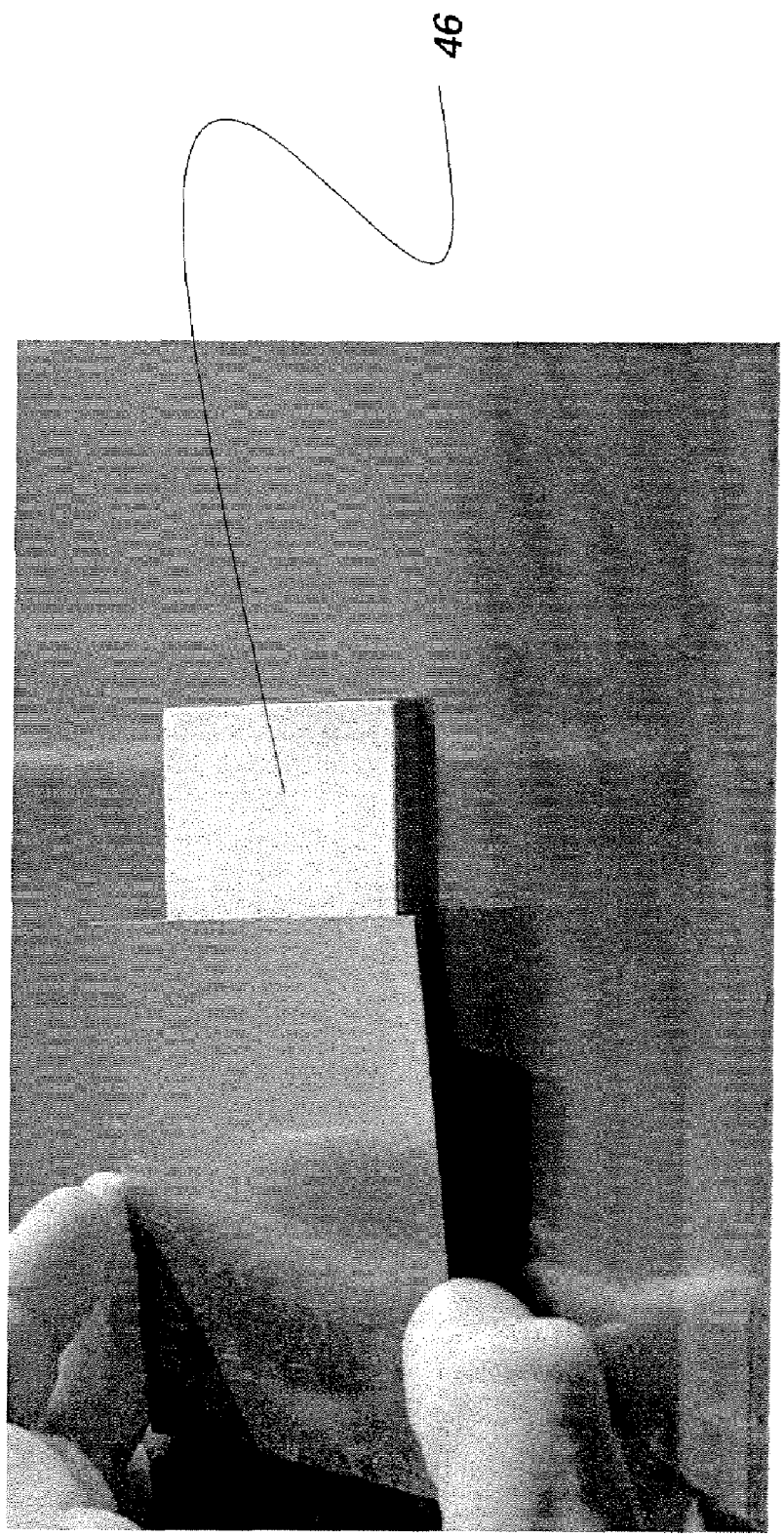
FIG. 6 is an exemplary flexible free-standing phosphor film of $Lu_2O_3:Eu^{3+}$.

According to exemplary embodiments, the free-standing phosphor film 10 comprises x-ray phosphor particles dispersed in a silicone binder, and FIG. 6 shows an example of such a film. Non-limiting examples of x-ray phosphors suitable for these applications include, but are not limited to, $Gd_2O_2S$:Tb, $Gd_2O_2S$:Eu, $CaWO_4$, $Y_2O_2S$:Tb, $(YSr)TaO_4$, $(YSr)TaO_4$:Gd, $(YSr)TaO_4$:Nb, $BaFCl$:Eu, $Lu_2O_3$:Eu, CsI:Tl, and combinations of these phosphors, or combinations of mentioned activators such as terbium and europium. The choice of a particular material or combinations of materials depends on the specific application. The free-standing film 10 is discussed in greater detail below with reference to FIGS. 5, 6, and 7.

For a blended phosphor embodiment, the free-standing phosphor film 10 includes at least two phosphor powders. This blended phosphor is desirable for certain applications, including amorphous silicon panels. Because amorphous silicon panels are more sensitive to green light, a blend of $Lu_2O_3$:Eu and GOS:Tb may be useful. In this configuration, the $Lu_2O_3$:Eu offers x-ray stopping power and good x-ray-to-light conversion efficiency, but emits in the red area of the spectrum. GOS:Tb provides moderate stopping power, has good conversion efficiency, but offers a better match with amorphous silicon photodetectors.

Figure 1:
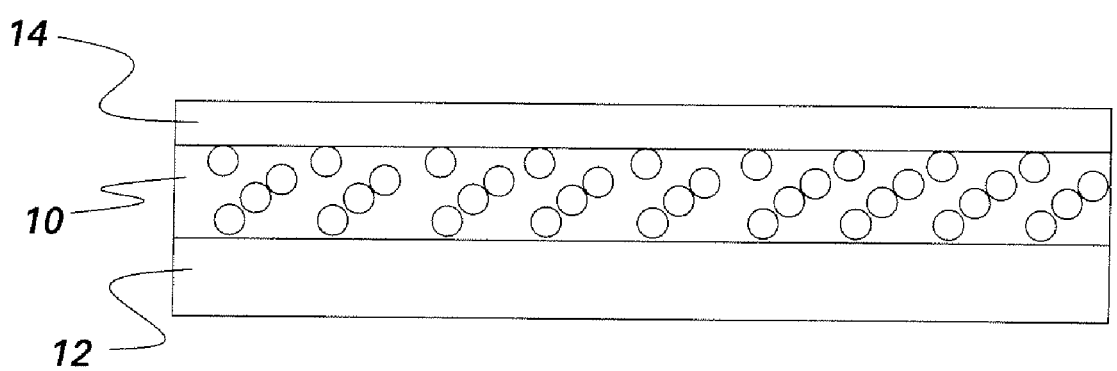
FIG. 1 schematically depicts an adaptable imaging assembly embodiment of the invention.

For the exemplary embodiment of FIG. 1, the adaptable imaging assembly 20 further includes an electron intensification layer 14 coupled to the free-standing phosphor film 10 and that is configured to receive the incident radiation prior to incidence on the free-standing phosphor film 10. Exemplary electron intensification layers 14 include metallic layers formed of metals with high atomic number, such as lead. Beneficially, electron intensification layers 14 reduce x-ray scatter. According to a particular embodiment, electron intensification layer 14 is directly coupled to the free-standing phosphor film 10. This direct coupling is facilitated by virtue of the fact that the free-standing film 10 does not have a substrate, such as a Mylar® backing. (Mylar® is a registered trademark of DuPont-Teijin Films.) This allows direct coupling on both sides of the film 10. Another advantage of the free standing phosphor film 10 is the fact that the low energy electrons emitted from the metal screen at low x-ray energies (<400 kV) are not stopped, as typically happens for conventional phosphor screens with Mylar® backings.

According to a particular embodiment, the electron intensification layer 14 is removable and replaceable. Beneficially, by configuring the electron intensification layer to be removable, it can be included for high-energy (>1 MeV) applications and removed for lower energy (<150 kV) applications. Similarly, by configuring the electron intensification layer 14 to be replaceable, different electron intensification layers 14 (either with respect to composition, thickness or both) may be employed for different imaging applications.

For another exemplary embodiment, the thickness of the free-standing phosphor film 10 is adjustable. For example, a single 100 micron phosphor layer may be employed for certain imaging applications, and one or more additional layers of 100 micron thick phosphors may be added to build up the thickness of the free-standing phosphor film 10 for other imaging applications. For this embodiment, the additional phosphor layers may include the same or different phosphors relative to the initial phosphor layer.

According to a particular embodiment, the free-standing phosphor film 10 is replaceable. Beneficially, by employing a replaceable phosphor film 10, different phosphors and/or different film thicknesses may be employed for different imaging applications. For example, for high spatial resolution, low energy imaging of small cracks or small porosity in castings, a 50-100 micron free standing phosphor composed of GOS:Tb may be employed directly attached to an amorphous silicon photodetector and may be used to perform nondestructive testing. For higher energy exposures of thicker castings, or larger steel components, a heavier phosphor may be used, again with the appropriate thickness for optimum x-ray capture. More specifically, the latter can also be configured with a metal screen such as 500 microns of lead or tungsten to further improve x-ray image quality. In addition, replacement operations may be performed for repair purposes.

According to a particular embodiment, the free-standing phosphor film 10 is attached to the electronic device 12. This may be accomplished in many ways, including pressure fitting the free-standing phosphor film 10 to the electronic device 12. For example, the phosphors may be pressed onto the device using the front cover plate. For other embodiments, a frame may also be used. More particularly, the film is pressure fit to a frame.

Figure 8:
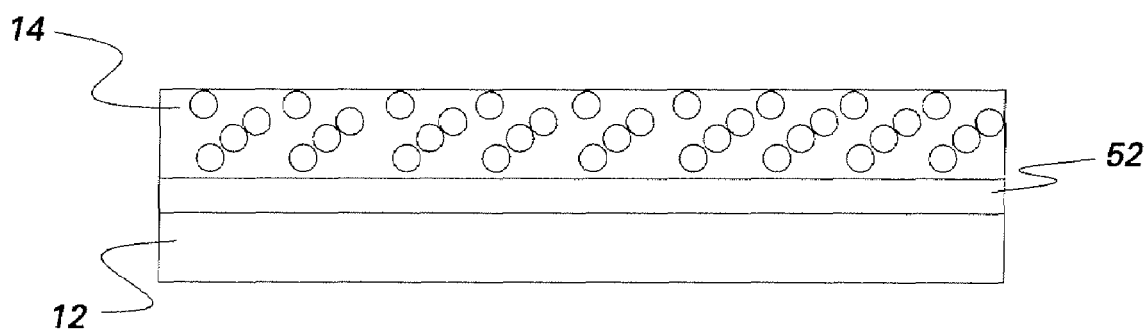
FIG. 8 schematically depicts an adaptable imaging assembly embodiment of the invention that employs a fiber optic plate.

FIG. 8 illustrates another exemplary set of embodiments of adaptable imaging assembly 20. As indicated in FIG. 8, adaptable imaging assembly 20 further includes a fiber optic plate (FOP) 52 disposed between the free-standing phosphor film 10 and the electronic device 12. The FOP may be non-scintillating or scintillating. Beneficially, the numerical aperture of the FOP may be adjusted to accept a shallower angle of incident light, in order to improve resolution of the adaptable imaging assembly 20. This permits improved tuning of spatial resolution and contrast. According to a particular embodiment, the electronic device 12 is an amorphous-silicon panel.

The FOP may be beneficially combined with optical coupling fluids or optical cement. For example, an optical coupling fluid or optical cement (not shown) may be disposed between the free-standing phosphor film 10 and the FOP 52. In addition, an optical coupling fluid or optical cement may be disposed between the FOP 52 and the electronic device 12.

Figure 2:
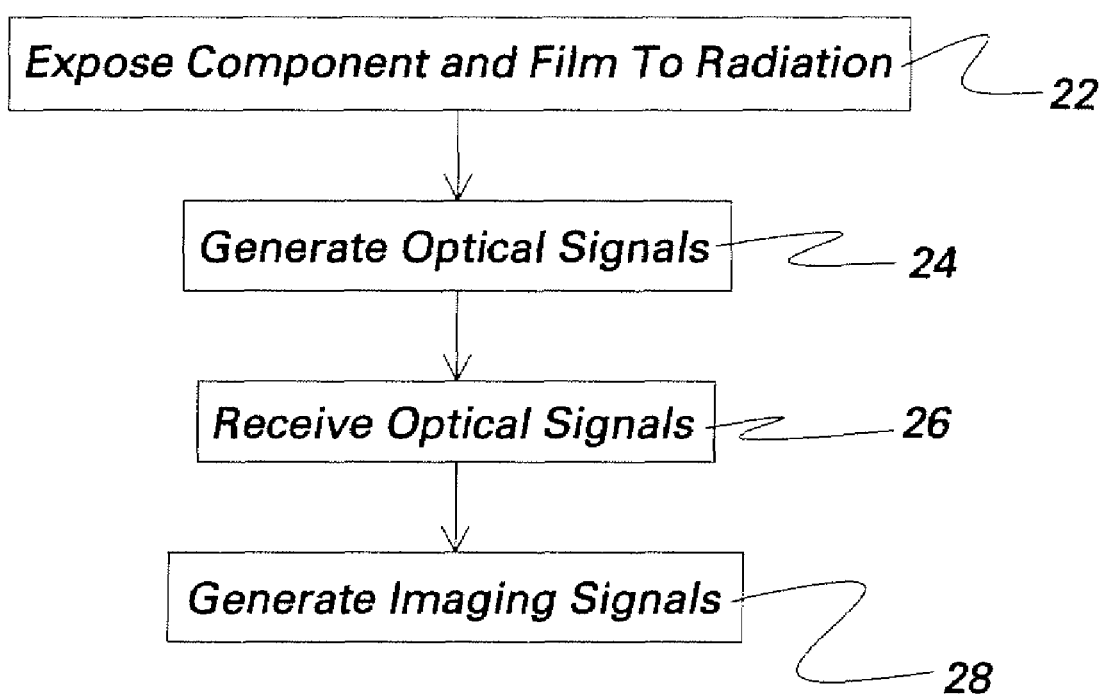
FIG. 2 is a flow diagram for an inspection method embodiment of the invention.
Figure 3:
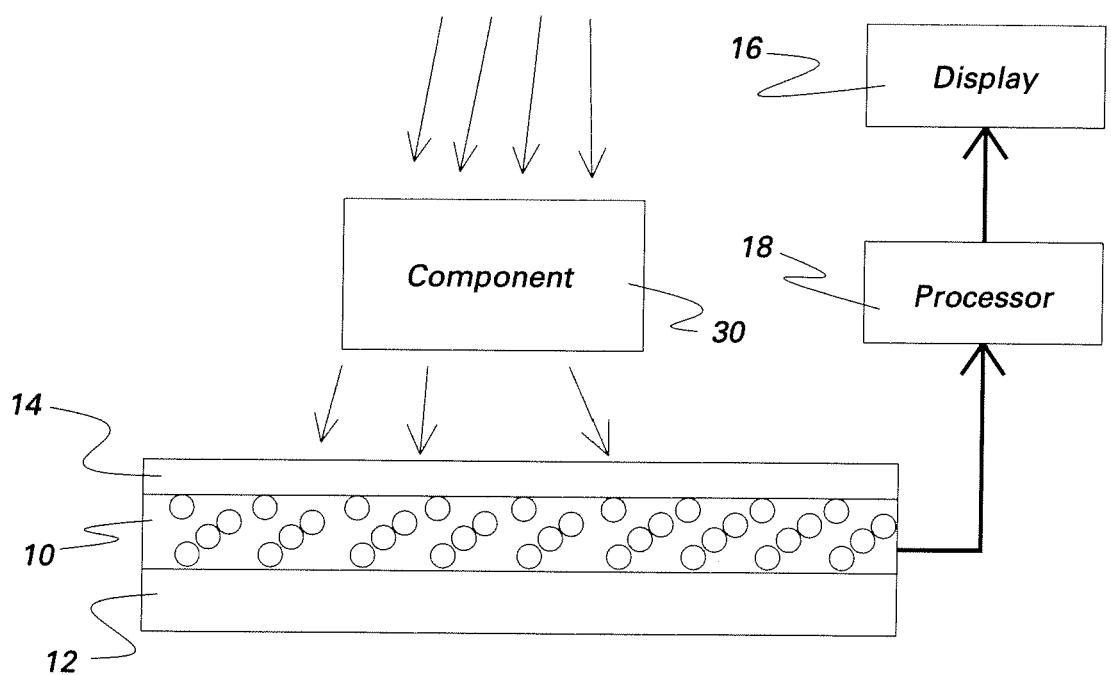
FIG. 3 further illustrates the inspection method of FIG. 2.

Adaptable imaging assembly 20 may be used to inspect components 30, examples of which include, without limitation, turbine blades, castings, welded assemblies, and aircraft fuselage frames. FIGS. 2 and 3 illustrate another embodiment of the invention, which is directed to a method for inspecting a component 30. As indicated in FIG. 2, the method includes at step 22 exposing the component 30 and a free-standing phosphor film 10 to radiation, generating corresponding optical signals with the free standing phosphor film 10 at step 24, and at step 26 receiving the optical signals with an electronic device 12, which is coupled to the free-standing phosphor film 10. The inspection method further includes, at step 28, generating an imaging signal using the electronic device 12. For the exemplary embodiment of FIG. 3, the imaging signal is subjected to a number of processing steps (not shown) in a processor 18, and an image of the component 30 is generated based on one or more imaging signals. In many embodiments, the image is displayed on a display 16, as indicated in FIG. 3.

Figure 4:
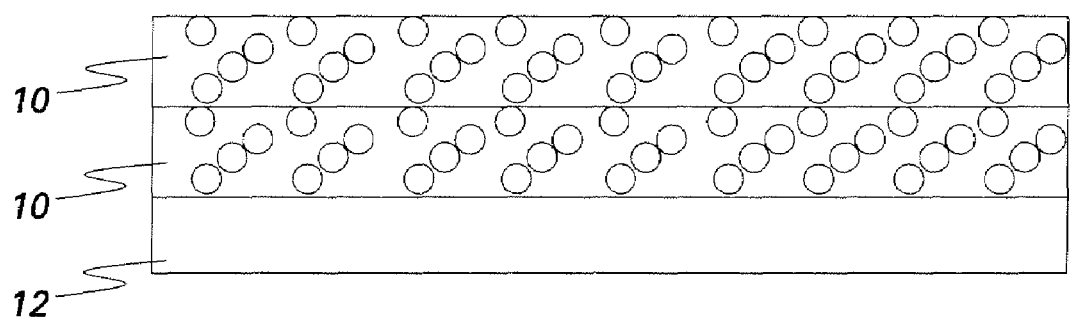
FIG. 4 illustrates a particular embodiment of the adaptable imaging assembly with multiple free-standing phosphor films.

According to particular embodiments, the method further includes performing at least one of the following operations: adjusting a thickness of the free-standing phosphor film 10, adding at least one layer of another free-standing phosphor film 10' (which may have the same or a different phosphor(s) as the original film 10) to the original free-standing phosphor film 10, as indicated for example, in FIG. 4, and replacing the free-standing phosphor film 10 with another free-standing phosphor film (for example, which differs in composition and/or thickness). The latter replacement operation may be employed either to modify or repair the free-standing phosphor film 10.

According to a particular embodiment, the method further includes reducing radiation scatter by coupling a high atomic number electron intensification layer 14 to the free-standing phosphor film 10. As used here, the phrase "high atomic number" indicates an atomic number of at least 26. In this manner, the metallic screen can offer not only scatter rejection, but will also offer further capture of photoelectrons emitted from the metal screen and therefore improved intensification from said metal layer. Metal layers are commonly used in industrial film imaging, where metals such as lead are placed in intimate contact with industrial x-ray film. This results in the primary capture medium for moderate energy x-rays above about 100 kV. The free-standing phosphor film offers direct contact for both the front surface with the photodetector array and for the back surface, with a metal "intensifying" screen. For more particular embodiments thereof, the method further includes performing at least one of the following operations: adjusting a thickness of the electron intensification layer 14, replacing the electron intensification layer 14, and removing the electron intensification layer 14.

Another aspect of the invention is to provide a free-standing phosphor film 10 comprising x-ray phosphor particles dispersed in a silicone binder. Non-limiting examples of x-ray phosphors suitable for these applications include, but are not limited to, $Gd_2O_2S:Tb$, $Gd_2O_2S:Eu$, $CaWO_4$, $Y_2O_2S:Tb$, $(YSr)TaO_4$, $(YSr)TaO_4:Gd$, $(YSr)TaO_4:Nb$, $BaFCl:Eu$, $Lu_2O_3:Eu$, $CsI:Tl$, and combinations of these phosphors. The choice of a particular material or combinations of materials depends on the specific application. In some exemplary embodiment, the x-ray phosphor is $Lu_2O_3:Eu$. $Lu_2O_3:Eu$ has the distinct advantages of high density and hence better x-ray stoppage, and narrow band emission at 610 nm, which matches the spectral response of CCDs.

For a particular embodiment, the free-standing phosphor film comprises a blended phosphor comprising at least two different phosphors. In one particular embodiment, blended phosphor comprises $GOS:Tb^{3+}$ and $Lu_2O_3:Eu^3$. Blended phosphors may comprise a combination of phosphors suitable for specific applications. For example, for amorphous Si panels which are more sensitive towards green, a blend of $Lu_2O_3:Eu$ and GOS:Tb may be useful. These different phosphors may be combined to form a blend or may be used in different layers.

The removable and replaceable layers allow for easy handling. They may be repeatedly reused. Phosphor films may be changed in accordance with the associated electronics. For example, PMTs are sensitive to blue radiation and hence $BaFCl:Eu^{2+}$ phosphors are useful. On the other hand, CCDs are more sensitive to red, and hence $Lu_2O_3:Eu$ may be useful in those cases.

The thickness of the free-standing phosphor film may vary depending on the specific requirement. The sensitivity of the imager assembly is determined by the chemical composition of the phosphor film, its crystal structure, particle shape, the weight amount of phosphor content in the film, and the thickness of the phosphor film. In some embodiments, the thickness of the free-standing phosphor film is less than 1 millimeter. In other embodiments, the phosphor film has a thickness in a range from about 100 microns to about 500 microns. As used here, the term "about" should be understood to mean within ten percent of the stated thickness. Accordingly, "about 100 microns" should be understood to mean 100+/−10 microns, etc.

FIG. 5 shows a flow diagram of a method (indicated generally by reference numeral 32) for preparing a free-standing phosphor film according to one embodiment of the present invention. The method includes the steps of preparing a phosphor powder at step 34, where the phosphor includes an x-ray phosphor. The method includes preparing a binder solution including a silicone binder and a curing agent at step 36. At step 38, a slurry is prepared by mixing the binder solution and the phosphor powder. Step 40 includes forming a phosphor layer on a substrate by applying the slurry on the substrate. At step 42, the phosphor layer is cured to obtain a phosphor film. Step 44 includes removing the phosphor film from the substrate to obtain a free-standing phosphor film 10.

In step 34, a phosphor powder comprising an x-ray phosphor powder is prepared. The phosphor powder may be prepared by any synthesis method known in the art. Useful synthesis methods include solid state synthesis, co-precipitation, sol-gel synthesis, colloidal methods, flame spray pyrolysis, inverse-microemulsion technique, combustion method, oxalate precipitation method, and microwave synthesis. In one exemplary embodiment, a co-precipitation method with urea as the precipitant is used. This technique is particularly useful for the preparation of $Lu_2O_3:Eu$ phosphor powders with precise particle size and morphology. In another embodiment, ammonium carbonate is used as the precipitant. This technique is also useful for the preparation of $Lu_2O_3:Eu$ phosphor powder with controlled particle size, narrow size distribution and precise morphology. The synthesis method and the process conditions may be chosen depending on the size and shape of the phosphor particles that are required. According to a particular embodiment, the mean particle size of the phosphor particles varies from about 1 micron to about 25 microns. In some specific embodiments, the mean particle size ranges from about 4 microns to about 5 microns.

The co-precipitation method proves useful in yielding phosphor particles with extremely narrow size distribution and uniform spherical morphology. Particle size and shape have significant influence on the rheological properties of the slurry. Particle size and morphology influence the packing density in the film. Moreover, it is known that sharper images are obtained with phosphor particles of smaller mean particle size. However, light emission efficiency declines with decreasing particle size. Thus, the optimum mean particle size for a given application is a compromise between imaging speed and image sharpness desired.

In step 36, a binder solution comprising a binder and a curing agent is prepared. The binder may be any binder compatible with the phosphor system. In some exemplary embodiments, a silicone binder is used. Silicone binders provide good refractive index matching characteristics with the phosphor particles, and allow light to emit from deep layers and hence enable the use of thick phosphor plates. In step 38, a slurry is prepared by mixing the binder solution and the phosphor powder. The amount of phosphor powder in the slurry is generally adjusted to have the best rheological character. Further additive agents may be mixed into the slurry, such as a dispersing agent for improving the dispersibility and to prevent rapid settling, and a platicizer for improving the binding force between the binder and the phosphor particles and to lower the risk of cracks. According to particular embodiments, the method includes the additional optional steps of deagglomeration and deairing of the slurry for better results. Step 40 includes forming a phosphor layer on a substrate by applying the slurry on the substrate. Any technique known in the art for preparing layers may be used for forming a phosphor layer. Non-limiting examples of useful formation techniques include, but are not limited to, spraying, screen printing, ink-jet printing, casting, wire-bar coating, extrusion coating, gravure coating, roll coating, and combinations thereof. In some exemplary embodiments, a casting technique, such as tape casting, is used. Tape casting proves useful for making large area thin ceramic sheets with controlled thickness and microstructure. A variety of substrates may be used for making the film, including, but not limited to plastic, glass, mica, metal substrates, and ceramic substrates. Step 42 includes curing the phosphor layer to obtain a phosphor film. Exemplary curing techniques may involve heating at a specified temperature for a specified duration, or microwave irradiation, or electron beam irradiation, or UV light exposure, or a combination of those. In step 44, the phosphor film is removed from the substrate to obtain a free-standing phosphor film 10. For example, the phosphor film may be peeled off by hand.

EXAMPLE

An example of the present invention will be described hereinafter. However, the invention is not to be limited by the following example.

Preparation of Free-standing Phosphor Film

The following example describes the preparation method for a free-standing phosphor film of $Lu_2O_3$:Eu. $Lu_2O_3$:Eu phosphor particles with a mean particle size of 5 microns and with spherical morphology were prepared by a urea assisted coprecipitation method. 2.5 ml of the phosphor powder was weighed and sieved through 100 mesh. 7.02 g of Dow corning Sylgard 184 base was mixed with 7 gm of curing agent in a 50 ml beaker to form a binder solution. The phosphor powder was added to the binder solution in the beaker and mixed vigorously for 5 minutes to remove agglomerates. The beaker was placed in a vacuum dessicator and cycled from vacuum to 1 atmosphere a few times to deair the suspension. A glass substrate of desired size was cleaned, and the suspension is formed into a phosphor layer of desired thickness by standard doctor blade technique. The tape was heated at 80° C. for 15 hrs. The phosphor film was peeled from the glass substrate to obtain a free standing $Lu_2O_3$:Eu film.

Figure 7:
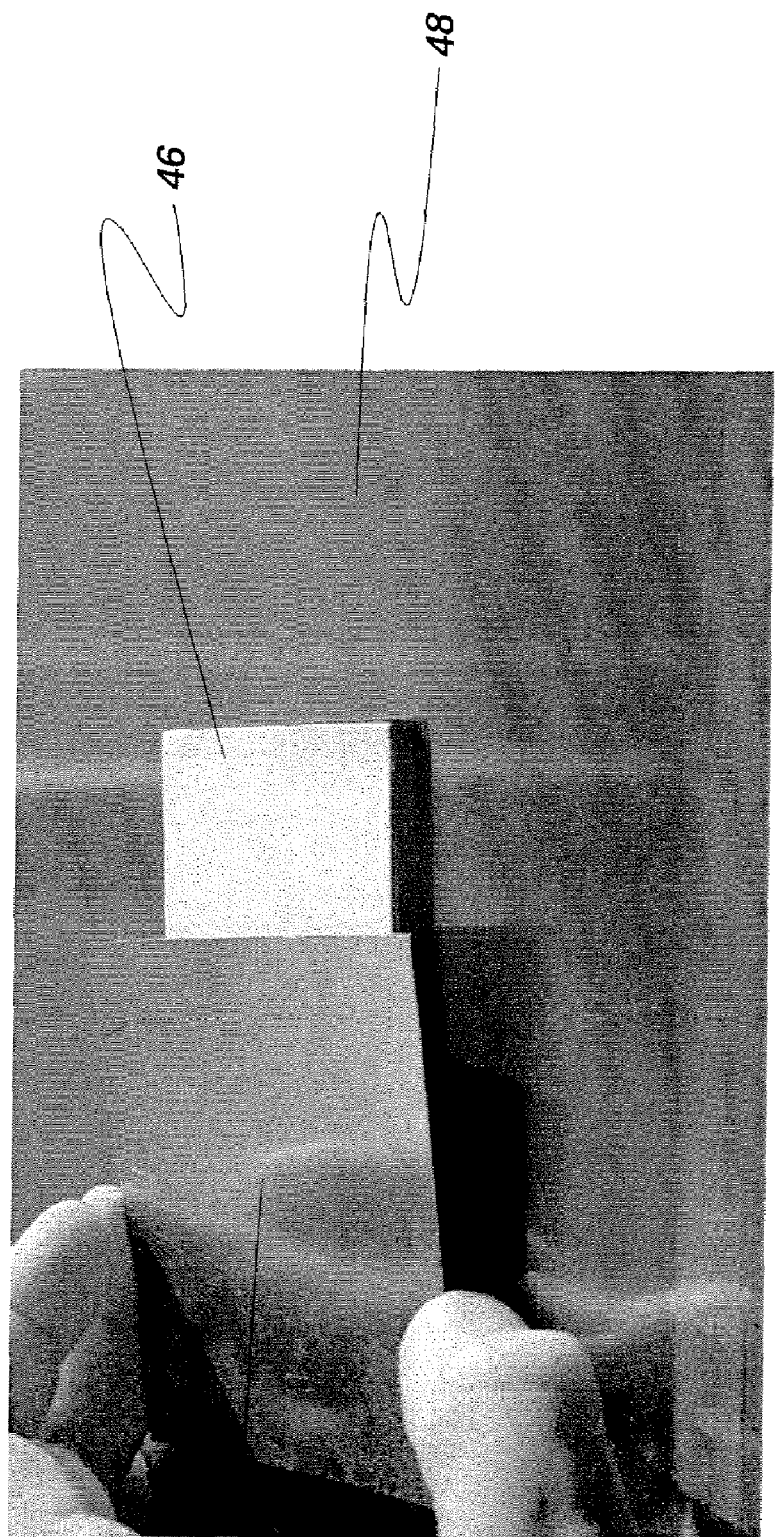
FIG. 7 is an exemplary flexible free-standing phosphor film of $Lu_2O_3:Eu^{3+}$ placed between a metal plate and a Si wafer.

FIG. 6 illustrates a flexible free-standing phosphor film of $Lu_2O_3$:$Eu^{3+}$ (46), prepared by method 32. These flexible free-standing films may be used in the imager assembly as described above. These free-standing films are flexible allowing intimate contact with the panels. For example FIG. 7 shows a free-standing film of $Lu_2O_3$:$Eu^{3+}$ (46) placed in intimate contact between a metal plate (50) and a Si wafer (48).

The imager assembly described herein may have a wide variety of uses. For example, it may be useful in any system where conversion of high-energy radiation to electric signals is involved. Specifically, it may be useful in a variety of industrial and medical imaging applications, including x-ray radiography, mammography, intra-oral radiography (in dentistry), fluoroscopy, x-ray computed tomography, radionuclide imaging such as positron emission tomography, industrial and non-destructive testing; passive and active screening of baggage and containers.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An adaptable imaging assembly comprising:
   a free-standing phosphor film configured to receive incident radiation and to emit a plurality of corresponding optical signals; and
   an electronic device coupled to said free-standing phosphor film, wherein said electronic device is configured to receive the optical signals from said free-standing phosphor film and to generate an imaging signal.

2. The adaptable imaging assembly of claim 1, wherein said free-standing phosphor film comprises a plurality of phosphor particles.

3. The adaptable imaging assembly of claim 2, wherein said free-standing phosphor film comprises a plurality of x-ray phosphor particles dispersed in a silicone binder.

4. The adaptable imaging assembly of claim 1, further comprising an electron intensification layer coupled to said free-standing phosphor film and configured to receive the incident radiation prior to incidence on said free-standing phosphor film.

5. The adaptable imaging assembly of claim 4, wherein said electron intensification layer is removable and replaceable.

6. The adaptable imaging assembly of claim 1, wherein a thickness of said free-standing phosphor film is adjustable.

7. The adaptable imaging assembly of claim 1, wherein said free-standing phosphor film is replaceable.

8. The adaptable imaging assembly of claim 1, wherein said free standing phosphor film is pressure fit to said electronic device.

9. The adaptable imaging assembly of claim 1, further comprising one of an optical coupling fluid and an optical cement disposed between said free-standing phosphor film and said electronic device.

10. The adaptable imaging assembly of claim 1, further comprising a fiber optic plate (FOP) disposed between said free-standing phosphor film and said electronic device, wherein said free-standing phosphor film comprises a plurality of phosphor particles dispersed in a binder, said phosphor particles comprising at least one phosphor selected from the group consisting of $Gd_2O_2S:Tb$, $Gd_2O_2S:Eu$, $CaWO_4$, $Y_2O_2S:Tb$, $(YSr)TaO_4(YSr)TaO_4:Gd$, $(YSr)TaO_4:Nb$, $BaFCl:Eu$, $Lu_2O_3:Eu$, $CsI:Tl$, and combinations thereof.

11. The adaptable imaging assembly of claim 10, further comprising one of an optical coupling fluid and an optical cement disposed between said free-standing phosphor film and said FOP.

12. The adaptable imaging assembly of claim 10, further comprising one of an optical coupling fluid and an optical cement disposed between said FOP and said electronic device.

13. A method for inspecting a component comprising:
 exposing the component and a free-standing phosphor film to radiation;
 generating a plurality of corresponding optical signals with said free standing phosphor film;
 receiving the optical signals with an electronic device coupled to said free-standing phosphor film; and
 generating an imaging signal using said electronic device.

14. The method of claim 13, further comprising performing at least one of:
 adjusting a thickness of the free-standing phosphor film;
 adding at least one layer of another free-standing phosphor film; and
 replacing the free-standing phosphor film.

15. The method of claim 14, wherein said layer and original free-standing phosphor film comprise different phosphors.

16. The method of claim 13, further comprising reducing radiation scatter by coupling an electron intensification layer to said free-standing phosphor film.

17. The method of claim 16, further comprising performing at least one of:
 adjusting a thickness of the electron intensification layer;
 replacing the electron intensification layer; and
 removing the electron intensification layer.

* * * * *